United States Patent
Yang et al.

(10) Patent No.: US 11,063,859 B2
(45) Date of Patent: Jul. 13, 2021

(54) PACKET PROCESSING METHOD AND NETWORK DEVICE

(71) Applicant: HUAWEI TECHNOLOGIES CO., LTD., Shenzhen (CN)

(72) Inventors: Xue Yang, Beijing (CN); Xudong Zhang, Beijing (CN); Qiangzhou Gao, Beijing (CN); Bo Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/447,927

(22) Filed: Jun. 20, 2019

(65) Prior Publication Data
US 2019/0312804 A1 Oct. 10, 2019

Related U.S. Application Data

(63) Continuation of application No. PCT/CN2017/115823, filed on Dec. 13, 2017.

(30) Foreign Application Priority Data

Dec. 20, 2016 (CN) .................. 2016 1118 8401.X

(51) Int. Cl.
*H04L 12/46* (2006.01)
*H04L 29/06* (2006.01)
(Continued)

(52) U.S. Cl.
CPC ............ *H04L 45/026* (2013.01); *H04L 12/46* (2013.01); *H04L 29/06* (2013.01); *H04L 47/15* (2013.01); *H04L 47/286* (2013.01); *H04L 69/22* (2013.01)

(58) Field of Classification Search
CPC ....... H04L 45/026; H04L 12/46; H04L 29/06; H04L 47/15; H04L 47/286; H04L 29/22
(Continued)

(56) References Cited

U.S. PATENT DOCUMENTS

2010/0020726 A1* 1/2010 Chu .................. H04L 45/48
                                                        370/256
2014/0149819 A1* 5/2014 Lu .................... H04L 45/745
                                                        714/748
(Continued)

FOREIGN PATENT DOCUMENTS

CN          101202734 A        6/2008
CN          101207555 A        6/2008
(Continued)

OTHER PUBLICATIONS

"International standard ISO/IEC 10589 intermediate system to intermediate system intra-domain routeing information echange protocol for use is conjunction with the protocol for providing the connectionless-mode network service", International Standard ISO/IEC, Apr. 30, 1992, p. 19-48, XP002957709.
(Continued)

*Primary Examiner* — Phong La

(57) ABSTRACT

Embodiments provide a packet processing method. In accordance with this method, a first LSP packet can be received by a network device. The following determinations can be made: that the network device stores no LSP packet whose LSP ID and PDU type are the same as an LSP ID and PDU type of the first LSP packet; that the network device has stored a second LSP packet whose LSP ID is the same as an LSP ID of the first LSP packet and PDU type is the same as a PDU type of the first LSP packet, and that a sequence number of the second LSP packet is less than a sequence number of the first LSP packet. When one or more of these determination are made, a determination whether LSP packet digest information matching the first LSP packet exists can be made. When the LSP packet digest information matching the first LSP packet is determined to exist, the first LSP packet can be stored.

9 Claims, 8 Drawing Sheets

(51) Int. Cl.
*H04L 12/751* (2013.01)
*H04L 12/801* (2013.01)
*H04L 12/841* (2013.01)

(58) Field of Classification Search
USPC .................................................... 370/254
See application file for complete search history.

(56) References Cited

U.S. PATENT DOCUMENTS

| | | | | |
|---|---|---|---|---|
| 2014/0286341 | A1* | 9/2014 | Gandhi | H04L 47/724 370/392 |
| 2014/0376562 | A1* | 12/2014 | Zhang | H04L 45/12 370/401 |
| 2015/0043383 | A1* | 2/2015 | Farkas | H04L 45/12 370/254 |
| 2015/0051954 | A1 | 2/2015 | Pullin | |
| 2015/0124642 | A1* | 5/2015 | Pani | H04L 12/4633 370/254 |
| 2015/0333920 | A1* | 11/2015 | Zhang | H04L 12/12 370/392 |
| 2016/0119392 | A1* | 4/2016 | Ramachandran | H04L 45/50 709/219 |
| 2016/0261721 | A1* | 9/2016 | Wu | H04L 69/22 |

FOREIGN PATENT DOCUMENTS

| | | |
|---|---|---|
| CN | 101394354 A | 3/2009 |
| CN | 101771601 A | 7/2010 |
| CN | 103095590 A | 5/2013 |
| CN | 103825817 A | 5/2014 |
| EP | 2421206 A1 | 2/2012 |
| WO | 2016120100 A1 | 8/2016 |

OTHER PUBLICATIONS

L. Ginsberg et al, IS-IS Minimum Remaining Lifetime draft-ietf-isis-remaining-lifetime-01.txt. May 1, 2016, 9 pages.

T. Li et al, IS-IS Cryptographic Authentication. RFC5304, Oct. 2008, 11 pages.

M. Bhatia et al, IS-IS Generic Cryptographic Authentication. RFC5310, Feb. 2009, 12 pages.

ISO/IEC 10589 Second edition, Nov. 15, 2002, Information technology—Telecommunications and information exchange between systems—Intermediate System to intermediate System intra-domain routeing information exchange protocol for use in conjunction with the protocol for providing the connectionless-mode network service (ISO 8473), 210 pages.

\* cited by examiner

PACKET PROCESSING METHOD AND NETWORK DEVICE

CROSS-REFERENCE TO RELATED APPLICATIONS

This application is a continuation of International Application No. PCT/CN2017/115823, filed on Dec. 13, 2017, which claims priority to Chinese Patent Application No. 201611188401.X, filed on Dec. 20, 2016. The disclosures of the aforementioned applications are hereby incorporated by reference in their entireties.

TECHNICAL FIELD

Embodiments of this application relate to the field of communications technologies, and in particular, to a packet processing method and a network device.

BACKGROUND

It is defined in the Intermediate System to Intermediate System (IS-IS) protocol that a link state protocol data unit (LSP) packet is used to release link state information. The LSP packet includes a Remaining Lifetime (Remaining Lifetime) field, and the Remaining Lifetime field is used to identify a remaining lifetime of the LSP packet in a network. A network device generating the LSP packet sets a value of the Remaining Lifetime field, and sends the LSP packet to another network device. After the another network device stores the LSP packet, the remaining lifetime decreases progressively with time. When the remaining lifetime decreases to 0, it indicates that the LSP packet needs to be deleted. If the link state information in the LSP packet is effective and is unchanged, the network device generating the LSP packet periodically refreshes the LSP packet and sends the LSP packet to the another device, that is, periodically sends the LSP packet to the another network device, to avoid the remaining lifetime of the LSP packet on the another network device decreasing to 0 and causing erroneous deletion of the LSP packet.

When the network device generating the LSP packet sends the LSP packet to the another network device, the remaining lifetime of the LSP packet may be made shorter due to a network failure or a hacker's attack, and a network device receiving the LSP packet deletes the LSP packet before receiving a refreshed LSP packet sent by the network device generating the LSP packet. Therefore, the LSP packet cannot be used by the another network device for path computation. In the prior art, to prevent the remaining lifetime of the LSP packet from being rewritten, the network device receiving the LSP packet directly sets the remaining lifetime of the LSP packet to MaxAge (MaxAge) of the remaining lifetime defined by the IS-IS protocol. However, during network flapping, this implementation causes the LSP packet to be always stored in the network device and unable to be deleted, and therefore storage resources of the network device are wasted.

SUMMARY

This application provides a packet processing method, resolve a technical problem in the prior art that resources of a network device are wasted because an LSP packet cannot be deleted during network flapping.

According to a first aspect, an embodiment of this application provides a packet processing method, and the method includes:

receiving, by a network device, a first LSP packet; determining, by the network device, whether the network device has stored an LSP packet whose LSP identity (ID) is the same as an LSP ID of the first LSP packet and whose protocol data unit (PDU) type is the same as a PDU type of the first LSP packet;

when determining that the network device stores no LSP packet whose LSP ID is the same as the LSP ID of the first LSP packet and whose PDU type is the same as the PDU type of the first LSP packet, or when determining that the network device has stored a second LSP packet, where an LSP ID of the second LSP packet is the same as the LSP ID of the first LSP packet, a PDU type of the second LSP packet is the same as the PDU type of the first LSP packet, and a sequence number (Sequence Number) of the second LSP packet is less than a sequence number of the first LSP packet, or when determining that the network device has stored a third LSP packet, where an LSP ID of the third LSP packet is the same as the LSP ID of the first LSP packet, a PDU type of the third LSP packet is the same as the PDU type of the first LSP packet, a sequence number of the third LSP packet is the same as a sequence number of the first LSP packet, and a checksum (Checksum) of the third LSP packet is less than a checksum of the first LSP packet, determining, by the network device, whether LSP packet digest information matching LSP packet digest information of the first LSP packet exists in an LSP packet digest information set that has been stored in the network device, where the LSP packet digest information set includes LSP packet digest information of one or more LSP packets that have been deleted by the network device, and the LSP packet digest information in the LSP packet digest information set includes an LSP ID, a PDU type, a sequence number, and a checksum; and when the network device determines that the LSP packet digest information matching the first LSP packet exists in the LSP packet digest information set, storing, by the network device, the first LSP packet.

In the foregoing technical solution, the network device stores the LSP packet digest information of the LSP packet that has been deleted by the network device, and when receiving the first LSP packet, determines whether the LSP packet digest information matching the first LSP packet exists in the LSP packet digest information set. When the LSP packet digest information matching LSP packet digest information of the first LSP packet exists in the LSP packet digest information set, it indicates that the first LSP packet has been deleted by the network device. In this case, a remaining lifetime of the first LSP packet does not need to be modified to a default value defined by the IS-IS protocol. The first LSP packet only needs to be directly stored until the first LSP packet is deleted when the remaining lifetime of the first LSP packet decreases to 0. This can effectively avoid a technical problem that resources of the network device are wasted because the LSP packet cannot be deleted during network flapping.

In a possible design, that the network device determines that the LSP packet digest information matching LSP packet digest information of the first LSP packet exists in the LSP packet digest information set includes:

determining, by the network device, that the LSP packet digest information in which an LSP ID is the same as the LSP ID of the first LSP packet, a PDU type is the same as the PDU type of the first LSP packet, a sequence number is the same as the sequence number of the first LSP packet, and a checksum is the same as the checksum of the first LSP packet exists in the LSP packet digest information set. Whether the first LSP packet has been deleted by the network device can be precisely determined by comparing LSP IDs, PDU types, sequence numbers, and checksums.

In a possible design, the method further includes: when the network device determines that no LSP packet digest information matching the LSP packet digest information of the first LSP packet exists in the LSP packet digest information set, modifying the remaining lifetime of the first LSP packet to a default value of a remaining lifetime defined by the IS-IS protocol, to generate a fourth LSP packet, and storing the fourth LSP packet.

When the network device determines that no LSP packet digest information matching the first LSP packet exists in the LSP packet digest information set, it indicates that the network device has not deleted the first LSP packet. In this case, the first LSP packet needs to be stored, and the remaining lifetime of the first LSP packet is modified to the default value defined by the IS-IS protocol. This can effectively avoid a problem that the first LSP packet is erroneously deleted because the remaining lifetime of the first LSP packet is rewritten.

In a possible design, the method further includes: when the network device determines that the network device has stored a fifth LSP packet, where an LSP ID of the fifth LSP packet is the same as the LSP ID of the first LSP packet, a PDU type of the fifth LSP packet is the same as the PDU type of the first LSP packet, and a sequence number of the fifth LSP packet is greater than the sequence number of the first LSP packet, or when the network device determines that the network device has stored a sixth LSP packet, where an LSP ID of the sixth LSP packet is the same as the LSP ID of the first LSP packet, a PDU type of the sixth LSP packet is the same as the PDU type of the first LSP packet, a sequence number of the sixth LSP packet is the same as the sequence number of the first LSP packet, and a checksum of the sixth LSP packet is greater than the checksum of the first LSP packet, avoiding, by the network device, storing the first LSP packet.

When the network device determines that the sequence number of the fifth LSP packet is greater than the sequence number of the first LSP packet, it indicates that a generation time of the fifth LSP packet is later than a generation time of the first LSP packet. To be specific, in comparison with the first LSP packet, content included in the fifth LSP packet is newer than content included in the first LSP packet. In this case, the first LSP packet does not need to be stored, and storage resources of the network device can be saved.

When the network device determines that the checksum of the sixth LSP packet is greater than the checksum of the first LSP packet, it indicates that a generation time of the sixth LSP packet is later than the generation time of the first LSP packet. To be specific, in comparison with the first LSP packet, content included in the sixth LSP packet is newer than the content included in the first LSP packet. In this case, the first LSP packet does not need to be stored, and the storage resources of the network device can be saved.

In a possible design, the method further includes: when the network device deletes the first LSP packet, generating LSP packet digest information of the first LSP packet, where the LSP packet digest information of the first LSP packet includes an LSP ID of the first LSP packet, a PDU type of the first LSP packet, a sequence number of the first LSP packet, and a checksum of the first LSP packet; and storing, by the network device, the LSP packet digest information of the first LSP packet in the LSP packet digest information set.

In a possible design, the method further includes: when the network device deletes the fourth LSP packet, generating LSP packet digest information of the fourth LSP packet, where the LSP packet digest information of the fourth LSP packet includes an LSP ID of the fourth LSP packet, a PDU type of the fourth LSP packet, a sequence number of the fourth LSP packet, and a checksum of the fourth LSP packet; and storing, by the network device, the LSP packet digest information of the fourth LSP packet into the LSP packet digest information set.

The network device stores the deleted LSP packet digest information, so that when receiving a new LSP packet subsequently, the network device determines whether the newly received LSP packet has been deleted. After determining that the newly received LSP packet has been deleted, the network device does not need to modify a remaining lifetime of the new LSP packet when storing the new LSP packet. This can effectively avoid a technical problem that resources of the network device are wasted because the LSP packet cannot be deleted during network flapping.

According to a second aspect, this application provides a network device. The network device includes:
  a receiving unit, configured to receive a first LSP packet;
  a first determining unit, configured to determine whether the network device has stored an LSP packet whose LSP ID is the same as an LSP ID of a first LSP packet and whose PDU type is the same as a PDU type of the first LSP packet;
  a second determining unit, configured to: when the first determining unit determines that the network device stores no LSP packet whose LSP ID is the same as the LSP ID of the first LSP packet and whose PDU type is the same as the PDU type of the first LSP packet, or when the first determining unit determines that the network device has stored a second LSP packet, where an LSP ID of the second LSP packet is the same as the LSP ID of the first LSP packet, a PDU type of the second LSP packet is the same as the PDU type of the first LSP packet, and a sequence number of the second LSP packet is less than a sequence number of the first LSP packet, or when the first determining unit determines that the network device has stored a third LSP packet, where an LSP ID of the third LSP packet is the same as the LSP ID of the first LSP packet, a PDU type of the third LSP packet is the same as the PDU type of the first LSP packet, a sequence number of the third LSP packet is the same as a sequence number of the first LSP packet, and a checksum of the third LSP packet is less than a checksum of the first LSP packet, determine whether LSP packet digest information matching the first LSP packet exists in an LSP packet digest information set that has been stored in the network device; and
  a processing unit, configured to: when the second determining unit determines that the LSP packet digest information matching the first LSP packet exists in the LSP packet digest information set, store the first LSP packet.

In a possible design, that the second determining unit determines that the LSP packet digest information matching LSP packet digest information of the first LSP packet exists in the LSP packet digest information set includes:

determining, by the second determining unit, that the LSP packet digest information in which an LSP ID is the same as the LSP ID of the first LSP packet, a PDU type is the same as the PDU type of the first LSP packet, a sequence number is the same as the sequence number of the first LSP packet, and a checksum is the same as the checksum of the first LSP packet exists in the LSP packet digest information set.

In a possible design, the processing unit is further configured to: when the second determining unit determines that no LSP packet digest information matching LSP packet digest information of the first LSP packet exists in the LSP packet digest information set, modify a remaining lifetime of the first LSP packet to a default value of a remaining lifetime defined by the IS-IS protocol, to generate a fourth LSP packet, and store the fourth LSP packet.

In a possible design, the processing unit is further configured to: when the second determining unit determines that the network device has stored a fifth LSP packet, where an LSP ID of the fifth LSP packet is the same as the LSP ID of the first LSP packet, a PDU type of the fifth LSP packet is the same as the PDU type of the first LSP packet, and a sequence number of the fifth LSP packet is greater than the sequence number of the first LSP packet, or when the network device determines that the network device has stored a sixth LSP packet, where an LSP ID of the sixth LSP packet is the same as the LSP ID of the first LSP packet, a PDU type of the sixth LSP packet is the same as the PDU type of the first LSP packet, a sequence number of the sixth LSP packet is the same as the sequence number of the first LSP packet, and a checksum of the sixth LSP packet is greater than the checksum of the first LSP packet, avoid storing the first LSP packet.

In a possible design, the network device further includes:
  a generation unit, configured to: when the processing unit deletes the fourth LSP packet, generate LSP packet digest information of the fourth LSP packet, where the LSP packet digest information of the fourth LSP packet includes an LSP ID of the fourth LSP packet, a PDU type of the fourth LSP packet, a sequence number of the fourth LSP packet, and a checksum of the fourth LSP packet, where
  the processing unit is further configured to store the LSP packet digest information of the fourth LSP packet generated by the generation unit into the LSP packet digest information set.

According to a third aspect, an embodiment of this application provides a network device. The network device includes a processor, a network interface, and a memory. The memory may be configured to store program code and data of the network device, and the processor is configured to invoke a program instruction in the memory to perform the method in the foregoing designs. For specific steps, refer to the foregoing aspect. Details are not described herein again.

According to a fourth aspect, an embodiment of this application provides a network device. The network device includes a main control board and an interface board. The main control board includes a first processor and a first memory. The interface board includes a second processor, a second memory, and an interface card. An inter-process communication (Inter-Process Communication, IPC) protocol control channel is established between the main control board and the interface board. The second memory may be configured to store program code and data of the interface board, and the second processor is configured to invoke a program instruction in the second memory to perform the following operations:
  triggering the interface card to receive a first LSP packet, and sending the first LSP packet to the main control board by using the IPC control channel.

The first memory may be configured to store program code and data of the main control board, and the first processor is configured to invoke a program instruction in the first memory to perform the following operations:
  receiving the first LSP packet sent by the interface board by using the IPC control channel, and determining whether the first memory has stored an LSP packet whose LSP ID is the same as an LSP ID of the first LSP packet and whose PDU type is the same as a PDU type of the first LSP packet; when determining that the first memory stores no LSP packet whose LSP ID is the same as the LSP ID of the first LSP packet and whose PDU type is the same as the PDU type of the first LSP packet, or when determining that the first memory has stored a second LSP packet, where an LSP ID of the second LSP packet is the same as the LSP ID of the first LSP packet, a PDU type of the second LSP packet is the same as the PDU type of the first LSP packet, and a sequence number of the second LSP packet is less than a sequence number of the first LSP packet, or when determining that the first memory has stored a third LSP packet, where an LSP ID of the third LSP packet is the same as the LSP ID of the first LSP packet, a PDU type of the third LSP packet is the same as the PDU type of the first LSP packet, a sequence number of the third LSP packet is the same as a sequence number of the first LSP packet, and a checksum of the third LSP packet is less than a checksum of the first LSP packet, determining whether LSP packet digest information matching the first LSP packet exists in an LSP packet digest information set in the first memory, and when determining that the LSP packet digest information matching the first LSP packet exists in the LSP packet digest information set, storing the first LSP packet.

According to a fifth aspect, an embodiment of this application provides a packet processing system, where the system includes a first network device and a second network device, and the first network device is configured to send a first LSP packet to the second network device. For functions performed by the second network device, refer to the functions of the network device in the foregoing first aspect.

According to a sixth aspect, a computer storage medium is provided and configured to store a computer software instruction used by the foregoing network device, where the computer software instruction includes a program used to execute the designs in the foregoing aspect.

Compared with the prior art, according to the technical solutions provided in the embodiments of the present application, the network device stores the LSP packet digest information of the LSP packet that has been deleted by the network device, and when receiving the first LSP packet, the network device determines whether the LSP packet digest information matching the first LSP packet exists in the LSP packet digest information set. When the LSP packet digest information matching the LSP packet digest information of the first LSP packet exists in the LSP packet digest information set, it indicates that the first LSP packet has been deleted by the network device. In this case, the remaining lifetime of the first LSP packet does not need to be modified to the default value defined by the IS-IS protocol. The first LSP packet only needs to be directly stored until the first LSP packet is deleted when the remaining lifetime of the first LSP packet decreases to 0. This can effectively avoid a technical problem that resources of the network device are wasted because the LSP packet cannot be deleted during network flapping.

After a network device deletes a LSP packet, the network device stores the LSP packet digest information of the LSP packet. When the network device receives one LSP packet again, the network device determines whether the digest information stored matching the received LSP packet. When the LSP packet digest information matching the received LSP packet, it indicates that the received LSP packet has been deleted by the network device before. That is, the received LSP packet is loop back. In this case, the remaining lifetime of the received LSP packet does not need to be modified to the default value defined by the IS-IS protocol. The received LSP packet only needs to be directly stored until the received LSP packet is deleted when the remaining lifetime of the first LSP packet decreases to 0.

BRIEF DESCRIPTION OF DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following describes embodiments of the present application with reference to accompanying drawings.

Figure 1:
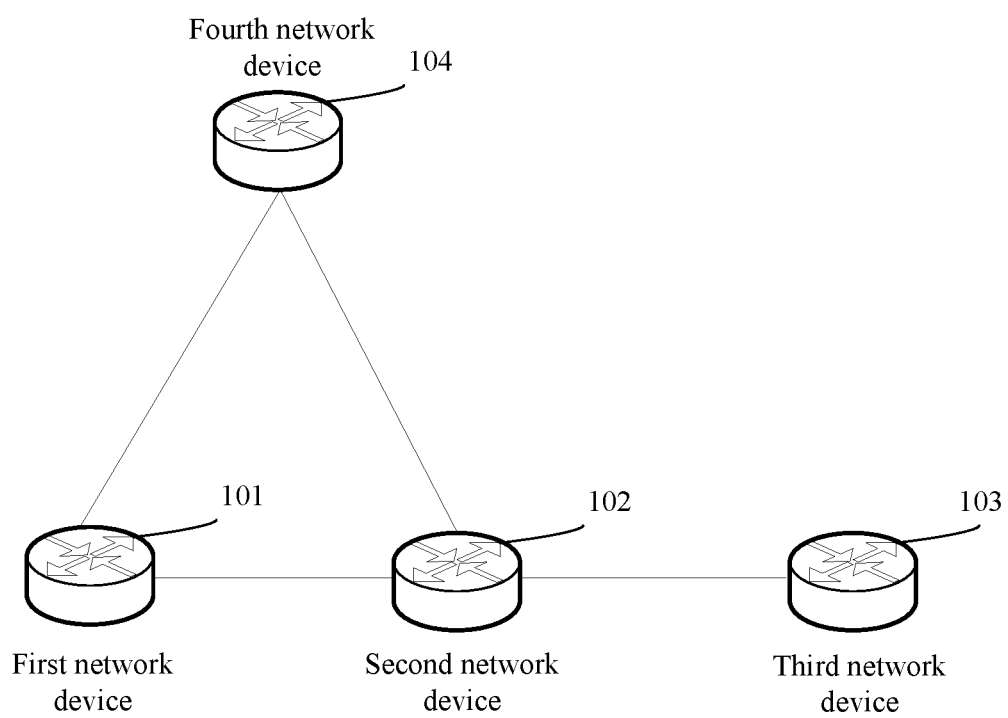
FIG. 1 is a schematic diagram of an application network scenario of a packet processing method according to an embodiment of this application.

FIG. 1 is a schematic diagram of an application network scenario of a packet processing method according to an embodiment of this application. The network scenario includes a first network device 101, a second network device 102, a third network device 103, and a fourth network device 104. The following uses an example to specifically describe a technical problem existing in the prior art.

In the network scenario shown in FIG. 1, the fourth network device 104 generates an LSP packet, and copies the LSP packet to generate a first LSP packet and a second LSP packet. Content included in the first LSP packet is the same as content included in the second LSP packet. The fourth network device 104 sends the first LSP packet to the first network device 101, and the first network device 101 stores the first LSP packet after receiving the first LSP packet. The fourth network device 104 sends the second LSP packet to the second network device 102, and the second network device 102 stores the second LSP packet after receiving the second LSP packet. After the first network device 101 receives the first LSP packet and the second network device 102 receives the second LSP packet, the fourth network device 104 is disconnected from a network for a reason such as a network failure. A remaining lifetime of the first LSP packet stored in the first network device 101 is 10 seconds, and a remaining lifetime of the second LSP packet stored in the second network device 102 is also 10 seconds. At this time, the third network device 103 joins the network, and establishes an IS-IS neighbor relationship with the second network device 102. Based on a principle of the IS-IS protocol, the second network device 102 needs to synchronize an LSP packet with a network device that establishes the neighbor relationship with the second network device 102. The second network device 102 sends the locally stored second LSP packet to the third network device 103, and the third network device 103 modifies the remaining lifetime of the second LSP packet from 10 seconds to MaxAge after receiving the second LSP packet, to generate a third LSP packet. For example, MaxAge is 1200 seconds. Five seconds later, due to network flapping, the third network device 103 is disconnected from the second network device 102, that is, the IS-IS neighbor relationship is disconnected. Another five seconds later, the remaining lifetime of the first LSP packet in the first network device 101 decreases to 0, and the first network device 101 deletes the first LSP packet; the remaining lifetime of the second LSP packet in the second network device 102 decreases to 0, and the second network device 102 deletes the second LSP packet. Because the second network device 102 has already been disconnected from the third network device 103, a purge (Purge) packet used by the second network device 102 to delete the second LSP packet cannot be flooded to the third network device 103, the third network device 103 always stores the third LSP packet, and the third LSP packet cannot be deleted until a remaining lifetime of the third LSP packet decreases to 0. However, an original initiator of the third LSP packet is the fourth network device 104, and the fourth network device 104 left the network 1210 seconds ago. In this case, the foregoing implementation causes a waste of storage resources of the fourth network device 104. In addition, when the second network device 102 is connected to the third network device 103 again, the third network device 103 sends the third LSP packet to the second network device 102. When receiving the third LSP packet, the second network device 102 modifies the remaining lifetime of the third LSP packet to 1200 seconds and stores the modified third LSP packet. When the third network device 103 is disconnected from and connected to the second network device 102 repeatedly, an LSP packet of the fourth network device 104 serving as the original initiator is always stored in the network, causing a waste of network resources. To resolve the foregoing technical problem, the embodiments of this application provide a packet processing method, a network device, and a system, which are described below with reference to specific embodiments.

Figure 2A:
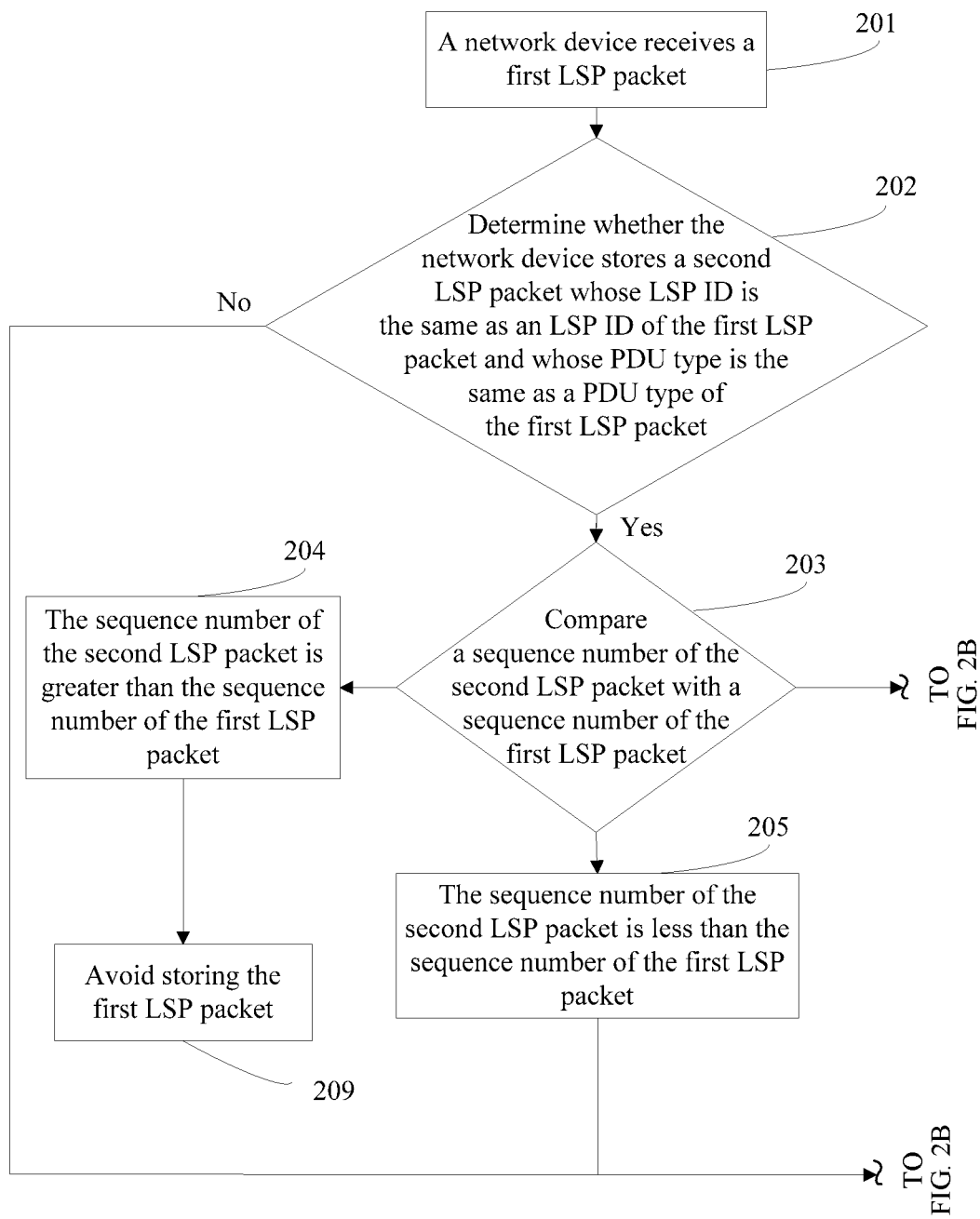
FIG. 2A and FIG. 2B are a schematic flowchart of a packet processing method according to an embodiment of this application.
Figure 2B:
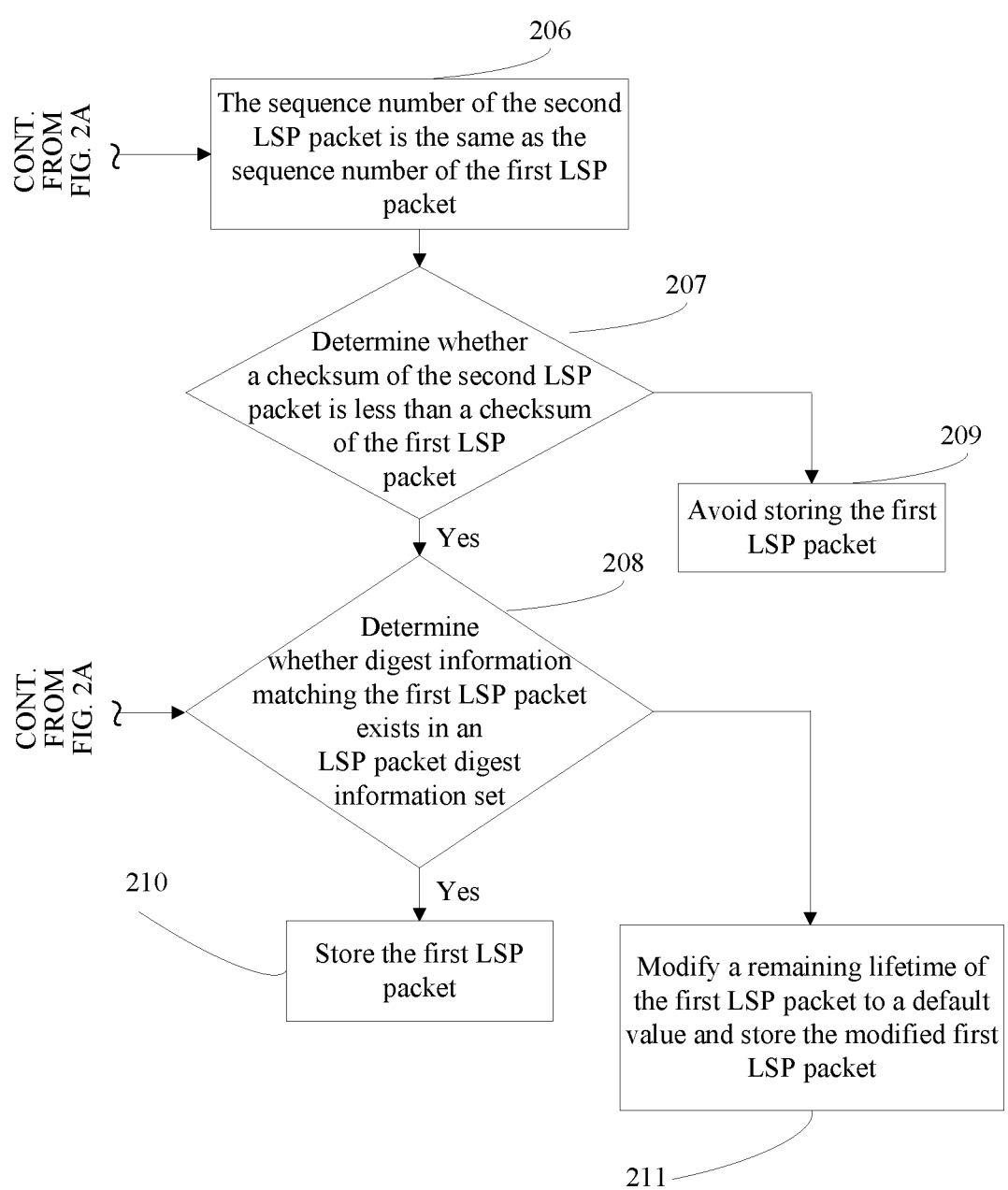

Referring to FIG. 2A and FIG. 2B, an embodiment provides a packet processing method. The method includes the following steps.

201. A network device receives a first LSP packet. The first LSP packet is sent by a second network device in an IS-IS neighbor relationship with the network device. The network device may store the first LSP packet in a link state database (LSDB) of the network device for subsequent computation of a forwarding path.

202. The network device determines whether the network device has stored a second LSP packet whose LSP ID is the same as an LSP ID of the first LSP packet and whose PDU type is the same as a PDU type of the first LSP packet. With reference to FIG. 1, for example, an IS-IS neighbor relationship is established between the second network device 102 and the third network device 103, and the second network device 102 generates an LSP packet, for example, an LSP packet A, based on link state information of the second network device 102, and sends the LSP packet A to the third network device 103. The second network device 102 regularly synchronizes the LSP packet A with the third network device 103 later, to prevent the LSP packet A in the third network device 103 from being deleted because a remaining lifetime of the LSP packet A decreases to 0. When link state information included in the LSP packet A does not change, an LSP ID and a PDU type of the LSP packet A that is regularly synchronized by the second network device 102 to the third network device 103 remain unchanged. In other words, the LSP ID and the PDU type of the LSP packet A sent by the second network device 102 to the third network device 103 do not change. In addition, before sending the LSP packet A to the third network device 103, the second network device 102 adds 1 to a sequence number of the LSP packet A. For example, after generating the LSP packet A, the second network device 102 sets the sequence number of the LSP packet A to 1, and then sends the LSP packet A to the third network device 103. After a time T, the second network device 102 modifies the sequence number of the LSP packet A to 2, and sends the LSP packet A whose sequence number is 2 to the third network device 103 to synchronize the LSP packet A. When the second network device 102 needs to synchronize the LSP packet A to the third network device 103 again after a time 2T, the second network device 102 modifies the sequence number of the LSP packet A to 3, and sends the LSP packet A whose sequence number is 3 to the third network device 103.

When the network device determines that the network device does not store the second LSP packet, the network device performs step 208: Determine whether LSP packet digest information matching the first LSP packet exists in an LSP packet digest information set that has been stored in the network device. When the network device stores no LSP packet whose LSP ID is the same as the LSP ID of the first LSP packet and whose PDU type is the same as the PDU type of the first LSP packet, it indicates that the network device does not store an LSP packet that is generated by a same network device serving as an original initiator.

203. When determining that the network device has stored the second LSP packet, the network device compares a sequence number of the second LSP packet with a sequence number of the first LSP packet.

204. When the network device determines that the sequence number of the second LSP packet is greater than the sequence number of the first LSP packet, perform step 209: Avoid storing the first LSP packet.

When the sequence number of the second LSP packet is greater than the sequence number of the first LSP packet, it indicates that a generation time of the second LSP packet is later than a generation time of the first LSP packet. To be specific, in comparison with the first LSP packet, content included in the second LSP packet is newer than content included in the first LSP packet. In this case, the first LSP packet does not need to be stored, and storage resources of the network device can be saved.

205. When the network device determines that the sequence number of the second LSP packet is less than the sequence number of the first LSP packet, perform step 208: Determine whether LSP packet digest information matching the first LSP packet exists in an LSP packet digest information set that has been stored in the network device.

When the sequence number of the second LSP packet is less than the sequence number of the first LSP packet, it indicates that the generation time of the second LSP packet is earlier than the generation time of the first LSP packet. To be specific, in comparison with the first LSP packet, the content included in the second LSP packet is older than the content included in the first LSP packet. In this case, the first LSP packet needs to be stored. Before the first LSP packet is stored, it is further required to determine whether the LSP packet digest information matching the first LSP packet exists in the LSP packet digest information set, that is, to perform step 208.

The LSP packet digest information set includes LSP packet digest information of one or more LSP packets that have been deleted by the network device, and the LSP packet digest information in the LSP packet digest information set includes an LSP ID, a PDU type, a sequence number, and a checksum. For example, when the network device deletes an LSP packet B, LSP packet digest information of the LSP packet B is stored. An LSP ID in the LSP packet digest information is the same as an LSP ID of the LSP packet B, a PDU type in the LSP packet digest information is the same as a PDU type of the LSP packet B, a sequence number in the LSP packet digest information is the same as a sequence number of the LSP packet B, and a checksum in the LSP packet digest information is the same as a checksum of the LSP packet B.

206. When the network device determines that the sequence number of the second LSP packet is the same as the sequence number of the first LSP packet, perform step 207: Determine whether a checksum of the second LSP packet is less than a checksum of the first LSP packet.

When the network device determines that the checksum of the second LSP packet is greater than or equal to the checksum of the first LSP packet, perform step 209: Avoid storing the first LSP packet. When the checksum of the second LSP packet is greater than the checksum of the first LSP packet, it indicates that the generation time of the second LSP packet is later than the generation time of the first LSP packet. To be specific, in comparison with the first LSP packet, the content included in the second LSP packet is newer than the content included in the first LSP packet. In this case, the first LSP packet does not need to be stored, and the storage resources of the network device can be saved.

When the network device determines that the checksum of the second LSP packet is less than the checksum of the first LSP packet, perform step 208: Determine whether LSP packet digest information matching the first LSP packet exists in an LSP packet digest information set that has been stored in the network device. When the checksum of the second LSP packet is less than the checksum of the first LSP packet, it indicates that the generation time of the first LSP packet is later than the generation time of the second LSP packet. To be specific, in comparison with the second LSP packet, the content included in the first LSP packet is newer than the content included in the second LSP packet.

210. When determining that the LSP packet digest information matching the first LSP packet exists in the LSP packet digest information set, the network device stores the first LSP packet, that is, directly stores the first LSP packet without modifying a remaining lifetime of the first LSP packet.

That the network device determines that the LSP packet digest information matching LSP packet digest information of the first LSP packet exists in the LSP packet digest information set includes:

determining, by the network device, that LSP packet digest information in which an LSP ID is the same as the LSP ID of the first LSP packet, a PDU type is the same as the PDU type of the first LSP packet, a sequence number is the same as the sequence number of the first LSP packet, and a checksum is the same as the checksum of the first LSP packet exists in the LSP packet digest information set.

When the LSP packet digest information matching the LSP packet digest information of the first LSP packet exists in the LSP packet digest information set, it indicates that the first LSP packet has been deleted by the network device. In this case, the first LSP packet may be an invalid LSP packet, and the remaining lifetime of the first LSP packet does not need to be modified based on the prior art to a default value defined by the IS-IS protocol. The first LSP packet only needs to be directly stored until the first LSP packet is deleted when the remaining lifetime of the first LSP packet decreases to 0. This can effectively avoid a technical problem that resources of the network device are wasted because the LSP packet cannot be deleted during network flapping. Optionally, when the LSP packet digest information matching the LSP packet digest information of the first LSP packet exists in the LSP packet digest information set, the first LSP packet may not be stored but be directly deleted. This can also effectively avoid the technical problem that the resources of the network device are wasted because the LSP packet cannot be deleted during network flapping.

With reference to FIG. 1, for example, the second network device 102 stores an LSP packet, for example, an LSP packet C, and a remaining lifetime of the LSP packet C is 10 seconds. The second network device 102 sends the LSP packet C to the third network device 103, and the third network device 103 stores the LSP packet C and modifies the remaining lifetime of the stored LSP packet C to MaxAge, that is, 1200 seconds. When determining that the remaining lifetime of the LSP packet C stored in the second network device 102 decreases to 0, the second network device 102 deletes the LSP packet C, stores digest information of the LSP packet C, and then sends a notification message for deleting the LSP packet C to the third network device 103. However, at this time, the third network device 103 is disconnected from the second network device 102 for a reason such as network flapping or a network failure, the notification message cannot reach the third network device 103 normally, and the third network device 103 cannot delete the stored LSP packet C. In this case, the remaining lifetime of the LSP packet C stored in the third network device 103 is 1190 seconds. When the network flapping stops or the network failure is rectified, the third network device 103 is connected to the second network device 102 again. According to a principle of the IS-IS protocol, the third network device 103 needs to synchronize the locally stored LSP packet C to the second network device 102. At this time, the remaining lifetime of the LSP packet C stored in the third network device 103 is 1000 seconds.

When receiving the LSP packet C and determining that the second network device 102 stores LSP packet digest information matching the LSP packet C, the second network device 102 directly stores the LSP packet C without modifying the remaining lifetime of the LSP packet C. In other words, the remaining lifetime of the LSP packet C stored in the second network device 102 is also 1000 seconds. When the remaining lifetime of the LSP packet C stored in the second network device decreases to 0, the second network device 102 deletes the stored LSP packet C. At the same time, because the remaining lifetime of the LSP packet C stored in the third network device 103 also decreases to 0, the third network device 103 also synchronously deletes the stored LSP packet C, so that the LSP packet C is also deleted from the network synchronously. Even if the third network device 103 is disconnected from the second network device 102 when the third network device 103 deletes the stored LSP packet C, and the third network device 103 cannot send the notification message for sending the LSP packet C to the second network device 102, the second network device 102 actively deletes the LSP packet C. Therefore, the LSP packet C does not remain in the network, network resources can be saved, and a waste of resources of the network device can be avoided.

In some embodiments, the network device may not store the first LSP packet. In the foregoing examples, when receiving the LSP packet C and determining that the second network device 102 stores the LSP packet digest information matching the LSP packet C, the second network device 102 deletes the LSP packet C instead of storing the LSP packet C.

211. When the network device determines that no LSP packet digest information matching the first LSP packet exists in the LSP packet digest information set, modify a remaining lifetime of the first LSP packet to a default value defined by the IS-IS protocol, and store the modified first LSP packet. Optionally, the default value may be MaxAge defined by the IS-IS protocol.

When the network device determines that no LSP packet digest information matching the first LSP packet exists in the LSP packet digest information set, it indicates that the network device has not deleted the first LSP packet. In this case, the first LSP packet needs to be stored, and the remaining lifetime of the first LSP packet is modified to the default value defined by the IS-IS protocol. This can effectively avoid the problem that the first LSP packet is erroneously deleted because the remaining lifetime of the LSP packet is rewritten.

Figure 3:
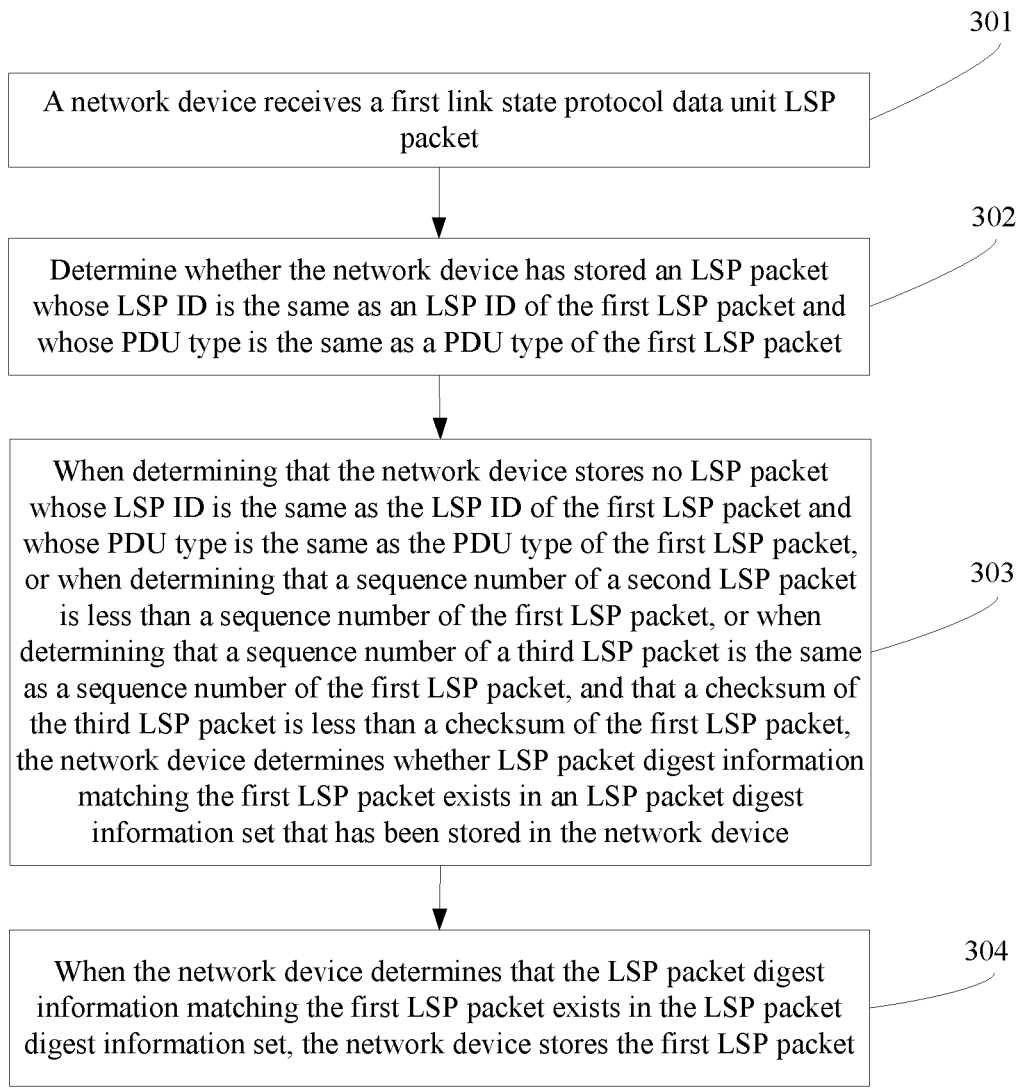
FIG. 3 is a schematic flowchart of another packet processing method according to an embodiment of this application.

With reference to the embodiment shown in FIG. 2A and FIG. 2B, referring to FIG. 3, an embodiment of this application provides a packet processing method. The method includes the following steps:

301. A network device receives a first LSP packet. The first LSP packet may be sent by a second network device in an IS-IS neighbor relationship with the network device.

302. The network device determines whether the network device has stored an LSP packet whose LSP ID is the same as an LSP ID of the first LSP packet and whose PDU type is the same as a PDU type of the first LSP packet.

303. When determining that the network device stores no LSP packet whose LSP ID is the same as the LSP ID of the first LSP packet and whose PDU type is the same as the PDU type of the first LSP packet, or when determining that the network device has stored a second LSP packet, where an LSP ID of the second LSP packet is the same as the LSP ID of the first LSP packet, a PDU type of the second LSP packet is the same as the PDU type of the first LSP packet, and a sequence number of the second LSP packet is less than a sequence number of the first LSP packet, or when determining that the network device has stored a third LSP packet, where an LSP ID of the third LSP packet is the same as the LSP ID of the first LSP packet, a PDU type of the third LSP packet is the same as the PDU type of the first LSP packet, a sequence number of the third LSP packet is less than a sequence number of the first LSP packet, and a checksum of the third LSP packet is less than a checksum of the first LSP packet, the network device determines whether LSP packet digest information matching the first LSP packet exists in an LSP packet digest information set that has been stored in the network device. For content of the LSP packet digest information, refer to the description in the embodiment shown in FIG. 2A and FIG. 2B. Details are not described herein again.

304. When the network device determines that the LSP packet digest information matching the first LSP packet exists in the LSP packet digest information set, the network device stores the first LSP packet.

The network device stores deleted LSP packet digest information into the LSP packet digest information set. An operation in which the network device deletes the LPS packet may be triggered by a purge packet flooded by a neighbor device of the network device, or may be triggered when a remaining lifetime of the LSP packet decreases to 0.

In some embodiments, the LSP packet digest information set records LSP packet digest information of each LSP packet that has been deleted by the network device.

When the network device determines that the LSP packet digest information matching the first LSP packet exists in the LSP packet digest information set, it indicates that the network device has deleted the first LSP packet. In this case, the network device does not need to modify a remaining lifetime of the first LSP packet to MaxAge, but directly stores the first LSP packet. In this way, the remaining lifetime of the first LSP packet in the network device keeps consistent with a remaining lifetime of the first LSP packet in the second network device. When the remaining lifetime decreases to 0, the network device and its neighbor network device synchronously delete the first LSP packet. In this way, the first LSP packet is not always stored in the network even if network flapping occurs, and a waste of network resources is avoided.

In some embodiments, when determining that no LSP packet digest information matching LSP packet digest information of the first LSP packet exists in the LSP packet digest information set, the network device modifies the remaining lifetime of the first LSP packet to a default value of a remaining lifetime defined by the IS-IS protocol, to generate a fourth LSP packet, and stores the fourth LSP packet. The default value may be MaxAge defined by the IS-IS protocol. When the network device determines that no LSP packet digest information matching the first LSP packet exists in the LSP packet digest information set, it indicates that the network device has not deleted the first LSP packet. In this case, the first LSP packet needs to be stored, and the remaining lifetime of the first LSP packet is modified to the default value defined by the IS-IS protocol. This can effectively avoid a problem that the first LSP packet is erroneously deleted because the remaining lifetime of the LSP packet is rewritten.

In some embodiments, when the network device determines that the network device has stored a fifth LSP packet, where an LSP ID of the fifth LSP packet is the same as the LSP ID of the first LSP packet, a PDU type of the fifth LSP packet is the same as the PDU type of the first LSP packet, and a sequence number of the fifth LSP packet is greater than the sequence number of the first LSP packet, or when the network device determines that the network device has stored a sixth LSP packet, where an LSP ID of the sixth LSP packet is the same as the LSP ID of the first LSP packet, a PDU type of the sixth LSP packet is the same as the PDU type of the first LSP packet, a sequence number of the sixth LSP packet is same as the sequence number of the first LSP packet, and a checksum of the sixth LSP packet is greater than the checksum of the first LSP packet, the network device avoids storing the first LSP packet.

In some embodiments, when deleting the fourth LSP packet, the network device generates LSP packet digest information of the fourth LSP packet. The LSP packet digest information of the fourth LSP packet includes an LSP ID of the fourth LSP packet, a PDU type of the fourth LSP packet, a sequence number of the fourth LSP packet, and a checksum of the fourth LSP packet.

The network device stores the LSP packet digest information of the fourth LSP packet into the LSP packet digest information set.

In some embodiments, when deleting the first LSP packet, the network device generates the LSP packet digest information of the first LSP packet. The LSP packet digest information of the first LSP packet includes the LSP ID of the first LSP packet, the PDU type of the first LSP packet, the sequence number of the first LSP packet, and the checksum of the first LSP packet. The network device stores the LSP packet digest information of the first LSP packet into the LSP packet digest information set.

The network device stores the deleted LSP packet digest information, so that when receiving a new LSP packet subsequently, the network device determines whether the newly received LSP packet has been deleted. After the network device determines that the newly received LSP packet has been deleted, the network device does not need to modify a remaining lifetime of the new LSP packet when storing the new LSP packet. This can effectively avoid a technical problem that resources of the network device are wasted because the LSP packet cannot be deleted during network flapping.

In some embodiments, before storing the LSP packet digest information of the first LSP packet into the LSP packet digest information set, the network device determines whether LSP packet digest information in which an LSP ID is the same as the LSP ID of the first LSP packet and a PDU type is the same as the PDU type of the first LSP packet exists in the LSP packet digest information set. When it is determined that no LSP packet digest information in which the LSP ID is the same as the LSP ID of the first LSP packet and the PDU type is the same as the PDU type of the first LSP packet exists in the LSP packet digest information set, the LSP packet digest information of the first LSP packet is stored into the LSP packet digest information set.

When it is determined that first LSP packet digest information in which an LSP ID is the same as the LSP ID of the first LSP packet and a PDU type is the same as the PDU type of the first LSP packet exists in the LSP packet digest information set, and a sequence number of the first LSP packet digest information is less than the sequence number of the first LSP packet, the LSP packet digest information of the first LSP packet is stored into the LSP packet digest information set, and the first LSP packet digest information is deleted at the same time, thereby ensuring that only LSP packet digest information of a current latest LSP packet corresponding to same link state information is stored.

When it is determined that second LSP packet digest information in which an LSP ID is the same as the LSP ID of the first LSP packet and a PDU type is the same as the PDU type of the first LSP packet exists in the LSP packet digest information set, and a sequence number of the second LSP packet digest information is the same as the sequence number of the first LSP packet, and a checksum of the second LSP packet digest information is less than the checksum of the first LSP packet, the LSP packet digest information of the first LSP packet is stored into the LSP packet digest information set, and the second LSP packet digest information is deleted at the same time, thereby ensuring that only LSP packet digest information of a current latest LSP packet corresponding to same link state information is stored.

Figure 4:
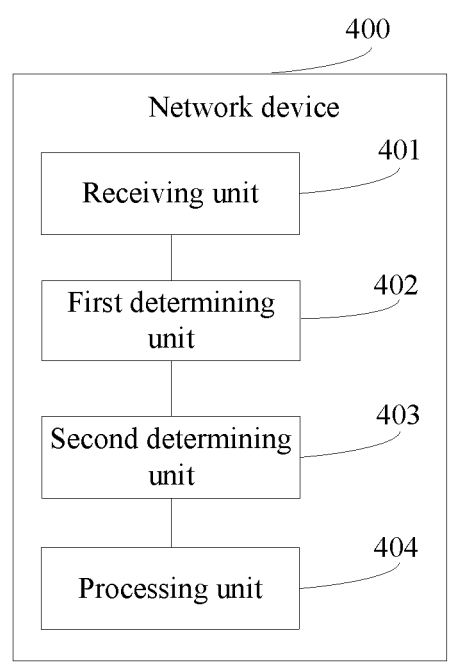
FIG. 4 is a schematic structural diagram of a network device according to an embodiment of this application.

Referring to FIG. 4, with reference to the application scenario shown in FIG. 1, an embodiment of this application provides a network device 400. The network device 400 in FIG. 4 may perform the method in the embodiment shown in FIG. 2A and FIG. 2B or FIG. 3, and the network device 400 may be the network device in the embodiment described in FIG. 2A and FIG. 2B or FIG. 3. The network device 400 includes: a receiving unit 401, a first determining unit 402, a second determining unit 403, and a processing unit 404.

The receiving unit 401 is configured to receive a first LSP packet.

The first determining unit 402 is configured to determine whether the network device 400 has stored an LSP packet whose LSP ID is the same as an LSP ID of the first LSP packet and whose PDU type is the same as a PDU type of the first LSP packet.

The second determining unit 403 is configured to: when the first determining unit 402 determines that the network device 400 stores no LSP packet whose LSP ID is the same as the LSP ID of the first LSP packet and whose PDU type is the same as the PDU type of the first LSP packet, or when the first determining unit 402 determines that the network device 400 has stored a second LSP packet, where an LSP ID of the second LSP packet is the same as the LSP ID of the first LSP packet, a PDU type of the second LSP packet is the same as the PDU type of the first LSP packet, and a sequence number of the second LSP packet is less than a sequence number of the first LSP packet, or when the first determining unit 402 determines that the network device 400 has stored a third LSP packet, where an LSP ID of the third LSP packet is the same as the LSP ID of the first LSP packet, a PDU type of the third LSP packet is the same as the PDU type of the first LSP packet, a sequence number of the third LSP packet is the same as a sequence number of the first LSP packet, and a checksum of the third LSP packet is less than a checksum of the first LSP packet, determine whether LSP packet digest information matching the first LSP packet exists in an LSP packet digest information set that has been stored in the network device 400, where the LSP packet digest information set includes LSP packet digest information of one or more LSP packets that have been deleted by the network device 400, and the LSP packet digest information in the LSP packet digest information set includes an LSP ID, a PDU type, a sequence number, and a checksum.

The processing unit 404 is configured to: when the second determining unit 403 determines that the LSP packet digest information matching the first LSP packet exists in the LSP packet digest information set, store the first LSP packet.

In some embodiments, that the second determining unit 403 determines that the LSP packet digest information matching LSP packet digest information of the first LSP packet exists in the LSP packet digest information set includes:
 determining, by the second determining unit 403, that LSP packet digest information in which an LSP ID is the same as the LSP ID of the first LSP packet, a PDU type is the same as the PDU type of the first LSP packet, a sequence number is the same as the sequence number of the first LSP packet, and a checksum is the same as the checksum of the first LSP packet exists in the LSP packet digest information set.

In some embodiments, the processing unit 404 is further configured to: when the second determining unit 403 determines that no LSP packet digest information matching LSP packet digest information of the first LSP packet exists in the LSP packet digest information set, modify a remaining lifetime of the first LSP packet to a default value of a remaining lifetime defined by the IS-IS protocol, to generate a fourth LSP packet, and store the fourth LSP packet.

In some embodiments, the processing unit 404 is further configured to: when the second determining unit 403 determines that the network device 400 has stored a fifth LSP packet, where an LSP ID of the fifth LSP packet is the same as the LSP ID of the first LSP packet, a PDU type of the fifth LSP packet is the same as the PDU type of the first LSP packet, and a sequence number of the fifth LSP packet is greater than the sequence number of the first LSP packet, or when the second determining unit 403 determines that the network device 400 has stored a sixth LSP packet, where an LSP ID of the sixth LSP packet is the same as the LSP ID of the first LSP packet, a PDU type of the sixth LSP packet is the same as the PDU type of the first LSP packet, a sequence number of the sixth LSP packet is the same as the sequence number of the first LSP packet, and a checksum of the sixth LSP packet is greater than the checksum of the first LSP packet, avoid storing the first LSP packet.

Figure 4A:
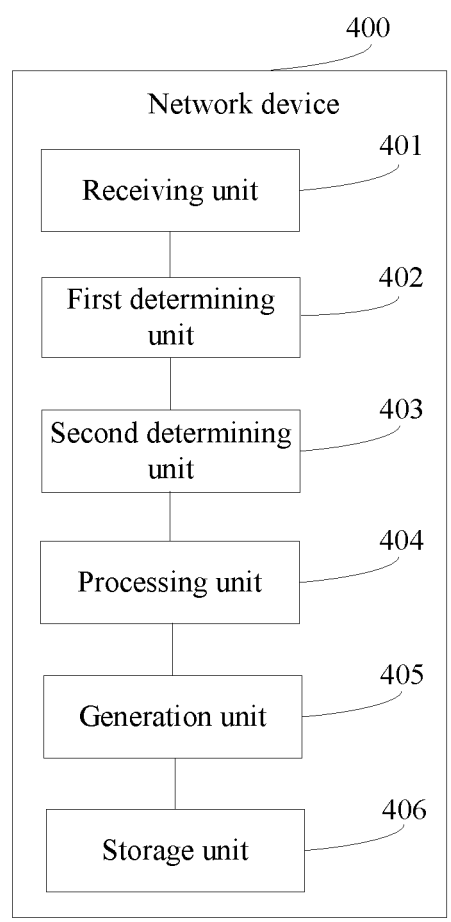
FIG. 4a is a schematic structural diagram of another network device according to an embodiment of this application.

In some embodiments, referring to FIG. 4a, the network device 400 further includes a generation unit 405 and a storage unit 406.

The generation unit 405 is configured to: when the processing unit 404 deletes the fourth LSP packet, generate LSP packet digest information of the fourth LSP packet, where the LSP packet digest information of the fourth LSP packet includes an LSP ID of the fourth LSP packet, a PDU type of the fourth LSP packet, a sequence number of the fourth LSP packet, and a checksum of the fourth LSP packet.

The storage unit 406 is further configured to store the LSP packet digest information of the fourth LSP packet generated by the generation unit 405 into the LSP packet digest information set.

Figure 5:
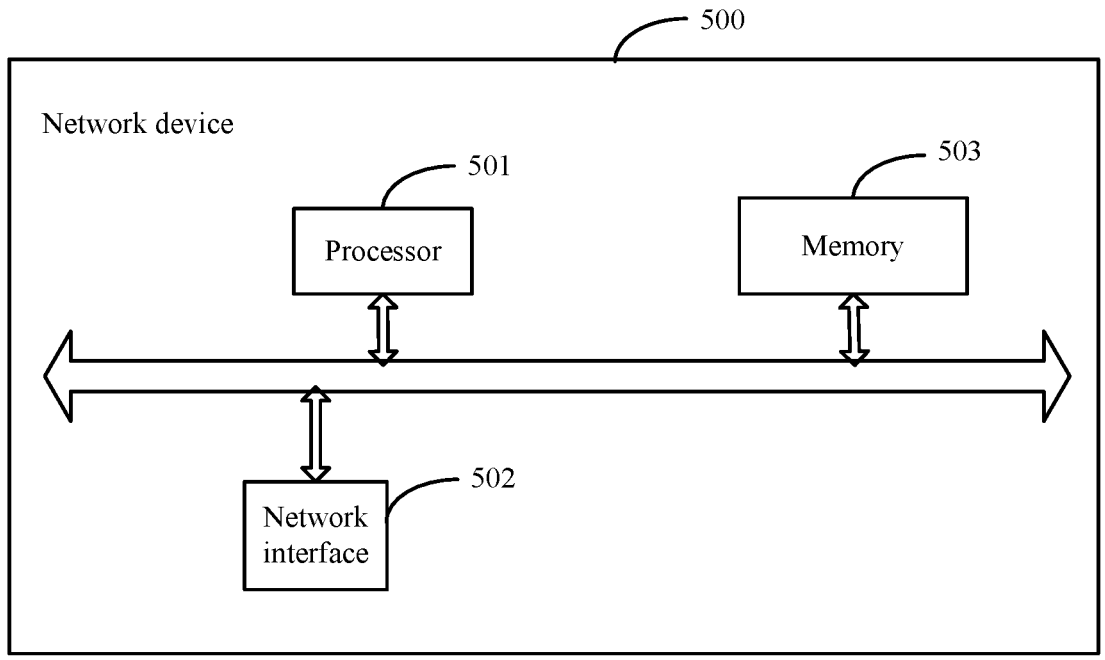
FIG. 5 is a schematic structural diagram of still another network device according to an embodiment of this application.

Referring to FIG. 5, an embodiment of this application provides a network device 500, and the network device 500 may perform the method in the embodiment shown in FIG. 2A and FIG. 2B or FIG. 3. The network device 500 may be the network device in the embodiment described in FIG. 2A and FIG. 2B or FIG. 3.

The network device 500 includes: a processor 501, a network interface 502, and a memory 503. The processor 501 includes but is not limited to one or more of a central processing unit (CPU), a network processor (NP), an application-specific integrated circuit (ASIC), or a programmable logic device (PLD). The foregoing PLD may be a complex programmable logic device (CPLD), a field-programmable gate array (FPGA), or a generic array logic (GAL).

The memory 503 includes but is not limited to a content-addressable memory (CAM), for example, a ternary content-addressable memory (TCAM), or a random-access memory (RAM).

The network interface 502 may include a common physical interface, and the physical interface may be an Ethernet interface or an asynchronous transfer mode (ATM) interface. The processor 501, the network interface 502, and the memory 503 may be integrated into one or more independent circuits or hardware, for example, an ASIC.

The memory 503 may be configured to store program code and data of the network device 500, and the processor 501 is configured to invoke a program instruction in the memory 503 to perform the method in the embodiment shown in FIG. 2A and FIG. 2B or FIG. 3. For specific steps, refer to the foregoing embodiments. Details are not described herein again.

Figure 6:
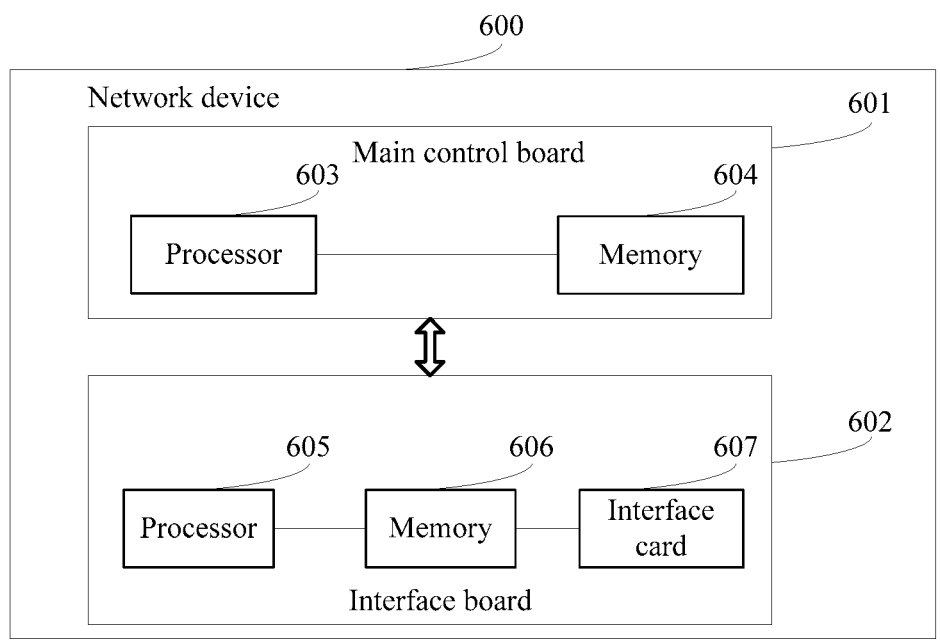
FIG. 6 is a schematic structural diagram of yet another network device according to an embodiment of this application.

Referring to FIG. 6, an embodiment of this application provides a network device 600, and the network device 600 may perform the method in the embodiment shown in FIG. 2A and FIG. 2B or FIG. 3. The network device 600 may be the network device in the embodiment described in FIG. 2A and FIG. 2B or FIG. 3.

The network device 600 includes: a main control board 601 and an interface board 602. The main control board 601 includes a processor 603 and a memory 604. The interface board 602 includes a processor 605, a memory 606, and an interface card 607.

The processor 603 includes but is not limited to one or more of a CPU, an NP, an ASIC, or a PLD. The foregoing PLD may be a CPLD, an FPGA, or a GAL. The processor 605 includes but is not limited to one or more of a CPU, an NP, an ASIC, or a PLD. The foregoing PLD may be a CPLD, an FPGA, or a GAL.

The memory 604 includes but is not limited to a CAM, a TCAM, or a RAM. The memory 606 includes but is not limited to a CAM, a TCAM, or a RAM.

An inter-process communication IPC protocol control channel is established between the main control board 601 and the interface board 602.

The memory 606 may be configured to store program code and data of the interface board 602, and the processor 605 is configured to invoke a program instruction in the memory 606 to perform the following operations:

triggering the interface card 607 to receive a first LSP packet; and sending the first LSP packet to the main control board 601 by using the IPC control channel.

The memory 604 may be configured to store program code and data of the main control board 601, and the processor 603 is configured to invoke a program instruction in the memory 604 to perform the following operations:

receiving the first LSP packet sent by the interface board 602 by using the IPC control channel;

determining whether the memory 606 has stored an LSP packet whose LSP ID is the same as an LSP ID of the first LSP packet and whose PDU type is the same as a PDU type of the first LSP packet;

when determining that the memory 606 stores no LSP packet whose LSP ID is the same as the LSP ID of the first LSP packet and whose PDU type is the same as the PDU type of the first LSP packet, or when determining that the memory 606 has stored a second LSP packet, where an LSP ID of the second LSP packet is the same as the LSP ID of the first LSP packet, a PDU type of the second LSP packet is the same as the PDU type of the first LSP packet, and a sequence number of the second LSP packet is less than a sequence number of the first LSP packet, or when determining that the memory 606 has stored a third LSP packet, where an LSP ID of the third LSP packet is the same as the LSP ID of the first LSP packet, a PDU type of the third LSP packet is the same as the PDU type of the first LSP packet, a sequence number of the third LSP packet is the same as a sequence number of the first LSP packet, and a checksum of the third LSP packet is less than a checksum of the first LSP packet, determining whether LSP packet digest information matching the first LSP packet exists in an LSP packet digest information set in the memory 606; and when determining that the LSP packet digest information matching the first LSP packet exists in the LSP packet digest information set, storing the first LSP packet.

In some embodiments, that the processor 603 determines that the LSP packet digest information matching LSP packet digest information of the first LSP packet exists in the LSP packet digest information set includes:

determining, by the processor 603, that LSP packet digest information in which an LSP ID is the same as the LSP ID of the first LSP packet, a PDU type is the same as the PDU type of the first LSP packet, a sequence number is the same as the sequence number of the first LSP packet, and a checksum is the same as the checksum of the first LSP packet exists in the LSP packet digest information set.

Figure 7:
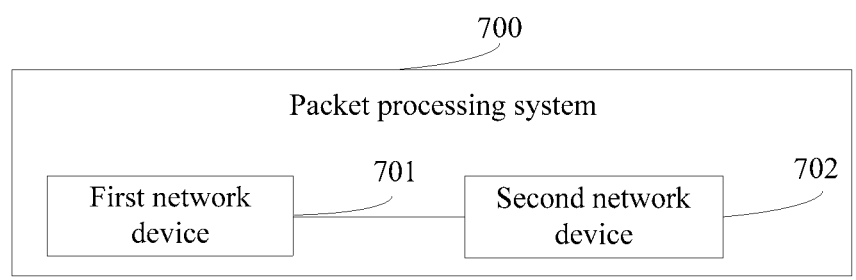
FIG. 7 is a schematic diagram of a system of a packet processing method according to an embodiment of this application.

Referring to FIG. 7, an embodiment of this application provides a packet processing system 700. The system includes a first network device 701 and a second network device 702.

The first network device 701 is configured to send a first LSP packet to the second network device 702.

The second network device 702 is configured to receive the first LSP packet sent by the first network device 701, and determine whether the second network device 702 has stored an LSP packet whose LSP ID is the same as an LSP ID of the first LSP packet and whose PDU type is the same as a PDU type of the first LSP packet.

When the second network device 702 determines that the second network device 702 stores no LSP packet whose LSP ID is the same as the LSP ID of the first LSP packet and whose PDU type is the same as the PDU type of the first LSP packet, or when the second network device 702 determines that the second network device 702 has stored a second LSP packet, where an LSP ID of the second LSP packet is the same as the LSP ID of the first LSP packet, a PDU type of the second LSP packet is the same as the PDU type of the first LSP packet, and a sequence number of the second LSP packet is less than a sequence number of the first LSP packet, or when the second network device 702 determines that the second network device 702 has stored a third LSP packet, where an LSP ID of the third LSP packet is the same as the LSP ID of the first LSP packet, a PDU type of the third LSP packet is the same as the PDU type of the first LSP packet, a sequence number of the third LSP packet is the same as a sequence number of the first LSP packet, and a checksum of the third LSP packet is less than a checksum of the first LSP packet, the second network device 702 determines whether LSP packet digest information matching the first LSP packet exists in an LSP packet digest information set that has been stored in the second network device 702, where the LSP packet digest information set includes LSP packet digest information of one or more LSP packets that have been deleted by the second network device 702, and the LSP packet digest information in the LSP packet digest information set includes an LSP ID, a PDU type, a sequence number, and a checksum.

When the second network device 702 determines that the LSP packet digest information matching the first LSP packet exists in the LSP packet digest information set, the second network device 702 stores the first LSP packet.

Optionally, the foregoing second network device 702 may be a network device in the embodiment shown in FIG. 2A and FIG. 2B, FIG. 3, FIG. 4, FIG. 5, or FIG. 6.

The "first" in the first LSP packet, the first determining unit, and the first network device that are mentioned in the embodiments of the present application is only used for notation and does not represent the first position in sequence. This rule is also applicable to "second", "third", "fourth", "fifth", and "sixth".

A person skilled in the art should be aware that in the foregoing one or more examples, functions described in the present application may be implemented by hardware, software, firmware, or any combination thereof. When the present application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a generic or dedicated computer. For example, the storage medium may be at least one of the following: any medium that can store program code, such as a read-only memory (Read-Only Memory, ROM), a RAM, a magnetic disk, or an optical disc.

Finally, it should be noted that the foregoing embodiments are merely intended for exemplarily describing the technical solutions of this application other than limiting this application.

Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A packet processing method, comprises:
   receiving, by a network device, a first link state protocol data unit (LSP) packet;
   determining, by the network device, whether LSP packet digest information of a LSP packet matching LSP packet digest information of the first LSP packet exists in an LSP packet digest information set that has been stored in the network device, wherein the LSP packet digest information set comprises LSP packet digest information of one or more LSP packets that have been deleted by the network device, and the LSP packet digest information of each of the one or more LSP packets in the LSP packet digest information set comprises an LSP ID, a PDU type, a sequence number, and a checksum;
   when the network device determines that the LSP packet digest information of the LSP packet matching the LSP packet digest information of the first LSP packet exists in the LSP packet digest information set, storing, by the network device, the first LSP packet; and
   when the network device determines that no LSP packet digest information matching the LSP packet digest information of the LSP packet exists in the LSP packet digest information set, changing a value of a remaining lifetime of the first LSP packet to a default value of a remaining lifetime defined by an Intermediate System to Intermediate System (IS-IS) protocol, generating a fourth LSP packet, and storing the fourth LSP packet.

2. The packet processing method according to claim 1, wherein that the network device determines that the LSP packet digest information of the LSP packet matching LSP packet digest information of the first LSP packet exists in the LSP packet digest information set comprises:
   determining, by the network device, that LSP packet digest information of one LSP packet, in which an LSP ID is the same as a LSP ID of the first LSP packet, a PDU type is the same as a PDU type of the first LSP packet, a sequence number is the same as a sequence number of the first LSP packet, and a checksum is the same as a checksum of the first LSP packet, exists in the LSP packet digest information set.

3. The packet processing method according to claim 1, further comprises:
   when the network device deletes the fourth LSP packet, generating LSP packet digest information of the fourth LSP packet, wherein the LSP packet digest information of the fourth LSP packet comprises an LSP ID of the fourth LSP packet, a PDU type of the fourth LSP packet, a sequence number of the fourth LSP packet, and a checksum of the fourth LSP packet; and
   storing, by the network device, the LSP packet digest information of the fourth LSP packet into the LSP packet digest information set.

4. A network device for packet processing, wherein the network device comprises:
   a memory comprising instructions;
   one or more processors coupled to the memory, wherein the instructions, when executed by the one or more processors, cause the network device to be configured to:
   receive a first link state protocol data unit (LSP) packet;
   determine whether LSP packet digest information of a LSP packet matching LSP packet digest information of the first LSP packet exists in an LSP packet digest information set that has been stored in the network device, wherein the LSP packet digest information set comprises LSP packet digest information of one or more LSP packets that have been deleted by the network device, and the LSP packet digest information of each of the one or more LSP packets in the LSP packet digest information set comprises an LSP ID, a PDU type, a sequence number, and a checksum;
   when determining that the LSP packet digest information of the LSP packet matching the LSP packet digest information of the first LSP packet exists in the LSP packet digest information set, store the first LSP packet; and
   when determining that no LSP packet digest information matching the LSP packet digest information of the LSP packet exists in the LSP packet digest information set, change a value of a remaining lifetime of the first LSP packet to a default value of a remaining lifetime defined by an Intermediate System to Intermediate System (IS-IS) protocol, to generate a fourth LSP packet, and store the fourth LSP packet.

5. The network device according to claim 4, wherein determining that the LSP packet digest information of the LSP packet matching LSP packet digest information of the first LSP packet exists in the LSP packet digest information set comprises:
    determining that LSP packet digest information of one LSP packet, in which an LSP ID is the same as a LSP ID of the first LSP packet, a PDU type is the same as a PDU type of the first LSP packet, a sequence number is the same as a sequence number of the first LSP packet, and a checksum is the same as a checksum of the first LSP packet, exists in the LSP packet digest information set.

6. The network device according to claim 4, wherein the instructions, when executed by the one or more processors, cause the first network device to be configured to:
    when deleting the fourth LSP packet, generate LSP packet digest information of the fourth LSP packet, wherein the LSP packet digest information of the fourth LSP packet comprises an LSP ID of the fourth LSP packet, a PDU type of the fourth LSP packet, a sequence number of the fourth LSP packet, and a checksum of the fourth LSP packet, and
    store the LSP packet digest information of the fourth LSP packet generated into the LSP packet digest information set.

7. A packet processing system comprising a first network device and a second network device, wherein
    the first network device is configured to send a first link state protocol data unit (LSP) packet to the second network device; and
    the second network device is configured to:
    receive the first LSP packet sent by the first network device;
    determine whether LSP packet digest information of a LSP packet matching LSP packet digest information of the first LSP packet exists in an LSP packet digest information set that has been stored in the second network device, wherein the LSP packet digest information set comprises LSP packet digest information of one or more LSP packets that have been deleted by the second network device, and the LSP packet digest information of each of the one or more LSP packets in the LSP packet digest information set comprises an LSP ID, a PDU type, a sequence number, and a checksum;
    when the second network device determines that the LSP packet digest information of the LSP packet matching the LSP packet digest information of the first LSP packet exists in the LSP packet digest information set, store, by the second network device, the first LSP packet; and
    when the second network device determines that no LSP packet digest information matching the LSP packet digest information of the first LSP packet exists in the LSP packet digest information set, change a value of a remaining lifetime of the first LSP packet to a default value of a remaining lifetime defined by an Intermediate System to Intermediate System (IS-IS) protocol, to generate a fourth LSP packet, and store the fourth LSP packet.

8. The packet processing system according to claim 7, wherein the second network device determines that the LSP packet digest information of the LSP packet matching LSP packet digest information of the first LSP packet exists in the LSP packet digest information set comprises:
    determining, by the second network device, that LSP packet digest information of one LSP packet, in which an LSP ID is the same as a LSP ID of the first LSP packet, a PDU type is the same as a PDU type of the first LSP packet, a sequence number is the same as a sequence number of the first LSP packet, and a checksum is the same as a checksum of the first LSP packet, exists in the LSP packet digest information set.

9. The packet processing system according to claim 7, wherein when the second network device deletes the fourth LSP packet, generating LSP packet digest information of the fourth LSP packet, wherein the LSP packet digest information of the fourth LSP packet comprises an LSP ID of the fourth LSP packet, a PDU type of the fourth LSP packet, a sequence number of the fourth LSP packet, and a checksum of the fourth LSP packet; and
    storing, by the second network device, the LSP packet digest information of the fourth LSP packet into the LSP packet digest information set.

* * * * *

UNITED STATES PATENT AND TRADEMARK OFFICE
CERTIFICATE OF CORRECTION

Page 1 of 1

PATENT NO. : 11,063,859 B2
APPLICATION NO. : 16/447927
DATED : July 13, 2021
INVENTOR(S) : Yang et al.

It is certified that error appears in the above-identified patent and that said Letters Patent is hereby corrected as shown below:

On the Title Page

Item (30) Foreign Applicant Priority Data: change "Dec. 20, 2016 (CN) ......... 20161118 8401.X" to "Dec. 20, 2016 (CN) ........... 201611188401.X";

In the Claims

In Claim 1, at Column 19, Line 48, change "A packet processing method, comprises" to "A packet processing method, comprising";

In Claim 1, at Column 20, Line 3, change "information of the LSP packet exists" to "information of the first LSP packet exists";

In Claim 3, at Column 20, Lines 22 and 23, change "The packet processing method according to claim 1, further comprises" to "The packet processing method according to claim 1, further comprising"; and In Claim 4, at Column 20, Line 59, change "LSP packet digest information of the LSP" to "LSP packet digest information of the first LSP".

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*